United States Patent [19]
Reuter

[11] Patent Number: 6,024,423
[45] Date of Patent: Feb. 15, 2000

[54] FLOW REGULATED BRAKING SYSTEM

[75] Inventor: David Fredrick Reuter, Beavercreek, Ohio

[73] Assignee: General Motors Corporation, Detroit, Mich.

[21] Appl. No.: 08/885,436

[22] Filed: Jun. 30, 1997

[51] Int. Cl.⁷ .................................. B60T 8/02; B60T 8/48
[52] U.S. Cl. ..................................... 303/115.4; 303/119.2
[58] Field of Search .............................. 303/113.5, 115.1, 303/1, 115.4, 116.1, 116.2, 119.1, 119.2, DIG. 10

[56] References Cited

U.S. PATENT DOCUMENTS

| | | | |
|---|---|---|---|
| 4,181,373 | 1/1980 | Vanni et al. | 303/115.4 |
| 4,606,585 | 8/1986 | Farr et al. | 303/115.4 |
| 4,691,969 | 9/1987 | Maehara | 303/115.4 |
| 5,066,075 | 11/1991 | Kaneda et al. | 303/115.4 |
| 5,538,336 | 7/1996 | Reuter et al. | 303/119.2 |
| 5,590,936 | 1/1997 | Reuter | 303/116.1 |
| 5,607,208 | 3/1997 | Reuter et al. | 303/113.5 |
| 5,618,086 | 4/1997 | Reuter | 303/119.2 |

FOREIGN PATENT DOCUMENTS

| | | | |
|---|---|---|---|
| 403287437 | 12/1991 | Japan | 303/115.4 |
| 2224088 | 4/1990 | United Kingdom | 303/115.4 |

*Primary Examiner*—Chris Schwartz
*Attorney, Agent, or Firm*—Robert M. Sigler

[57] ABSTRACT

A braking system includes a wheel brake, a master cylinder, and a modulator interposed in the braking system and interconnected with the wheel brake and the master cylinder so that fluid pressurization effected in the braking system by the master cylinder is communicated to the wheel brake through the modulator. An isolation valve is positioned in the modulator normally permitting an unrestricted fluid flow and pressure exchange between the master cylinder and the wheel brake through the modulator. The isolation valve is operable to isolate the wheel brake from the master cylinder by the repositioning of a moveable element in the isolation valve. A solenoid valve is associated with the modulator and is normally closed. The solenoid valve is openable so that fluid pressure is released from the wheel brake through the solenoid valve and substantially simultaneously, the moveable element of the isolation valve moves to close the isolation valve to isolate the wheel brake from the master cylinder. A flow regulating valve is positioned in the modulator and has a compensating piston that automatically moves to provide a substantially consistent flow rate through the flow regulating valve wherein the flow regulating valve has an upstream side that receives fluid pressure and a downstream side that is in fluid communication with the solenoid valve wherein the solenoid valve is sized to accept fluid flow during an ABS release cycle from both the wheel brake to reduce fluid pressure therein and from the flow regulating valve so that flow through the flow regulating valve does not increase fluid pressure at the wheel brake. Additionally, the flow regulating valve supplies fluid to the wheel brake during an ABS apply cycle at a tuned flow rate.

10 Claims, 5 Drawing Sheets

FLOW REGULATED BRAKING SYSTEM

TECHNICAL FIELD

The present invention relates to a flow regulated braking system. More particularly, the invention concerns the use of a flow regulating valve in a vehicle braking system to provide an improved hydraulic mechanization scheme for anti-lock braking control.

BACKGROUND OF THE INVENTION

Vehicle braking systems employing advanced fluid control capabilities for wheel anti-lock control and associated purposes are now familiar devices. The typical solenoid-based ABS system uses two solenoids per wheel or control channel to effect anti-lock control. One solenoid is normally open and the other is normally closed. Often, the overall braking system employs additional solenoids that are interconnected in the hydraulic circuit for various purposes. During an ABS cycle, the normally open solenoid is closed and the normally closed solenoid is opened in appropriate circumstances to effect wheel pressure reductions. The re-application of pressure is in general, effected by re-opening the normally open solenoid and re-closing the normally closed solenoid. This arrangement enables independent control channel pressure regulation for achieving increasing pressure, holding pressure, and decreasing pressure states. Disadvantageously, this type of system tends to be relatively costly to implement since two independent valves and corresponding electric drive circuits per control channel are required for operation. It would be economically beneficial if the number of solenoids necessary for the required pressure control could be reduced. However, any such system has been slow to develop for use in competitive application in any given vehicle platform. Accordingly, a desire continues to exist for a competitive, compact and flexible ABS system that is capable of high volume manufacture for real world application.

SUMMARY OF THE INVENTION

An aspect of the present invention resides in providing a competitive ABS capable braking system that utilizes in combination, a simplified mechanical isolation valve operationally coupled with a mechanical flow regulation valve that together, function with a solenoid release valve for each ABS control channel. In achieving this aspect, the present invention includes a braking system with a wheel brake, a master cylinder, and a modulator that is interposed in the braking system and is interconnected with the wheel brake and the master cylinder so that fluid pressurization effected in the braking system by the master cylinder is communicated to the wheel brake through the modulator.

An isolation valve is positioned in the modulator normally permitting unrestricted fluid flow and pressure exchange between the master cylinder and the wheel brake through the modulator. The isolation valve is operable to isolate the wheel brake from the master cylinder by the repositioning of a moveable element in the isolation valve. Preferably, the moveable element comprises a combination of a ball that interacts with a valve seat, and a piston that includes an extension reaching through the valve seat and normally unseating the ball through operation of an applied spring bias.

A solenoid valve is associated with the modulator and is normally closed. Preferably, the solenoid valve is positioned in a common bore with the isolation valve. The solenoid valve is openable so that fluid pressure is released from the wheel brake through the solenoid valve and substantially simultaneously, the moveable element of the isolation valve moves to close the isolation valve to isolate the wheel brake from the master cylinder.

A flow regulating valve is positioned in the modulator and has a compensating piston that automatically moves to provide a substantially consistent flow rate through the flow regulating valve. The flow regulating valve has an upstream side that receives fluid pressure and a downstream side that is in fluid communication with the solenoid valve wherein the solenoid valve is sized to accept fluid flow during an ABS release cycle from both the wheel brake to reduce fluid pressure therein, and from the flow regulating valve, so that flow through the flow regulating valve does not increase fluid pressure at the wheel brake. Additionally, the flow regulating valve supplies fluid to the wheel brake during an ABS apply cycle at a tuned flow rate.

DETAILED DESCRIPTION OF THE PRESENTLY PREFERRED EMBODIMENT

Figure 1:
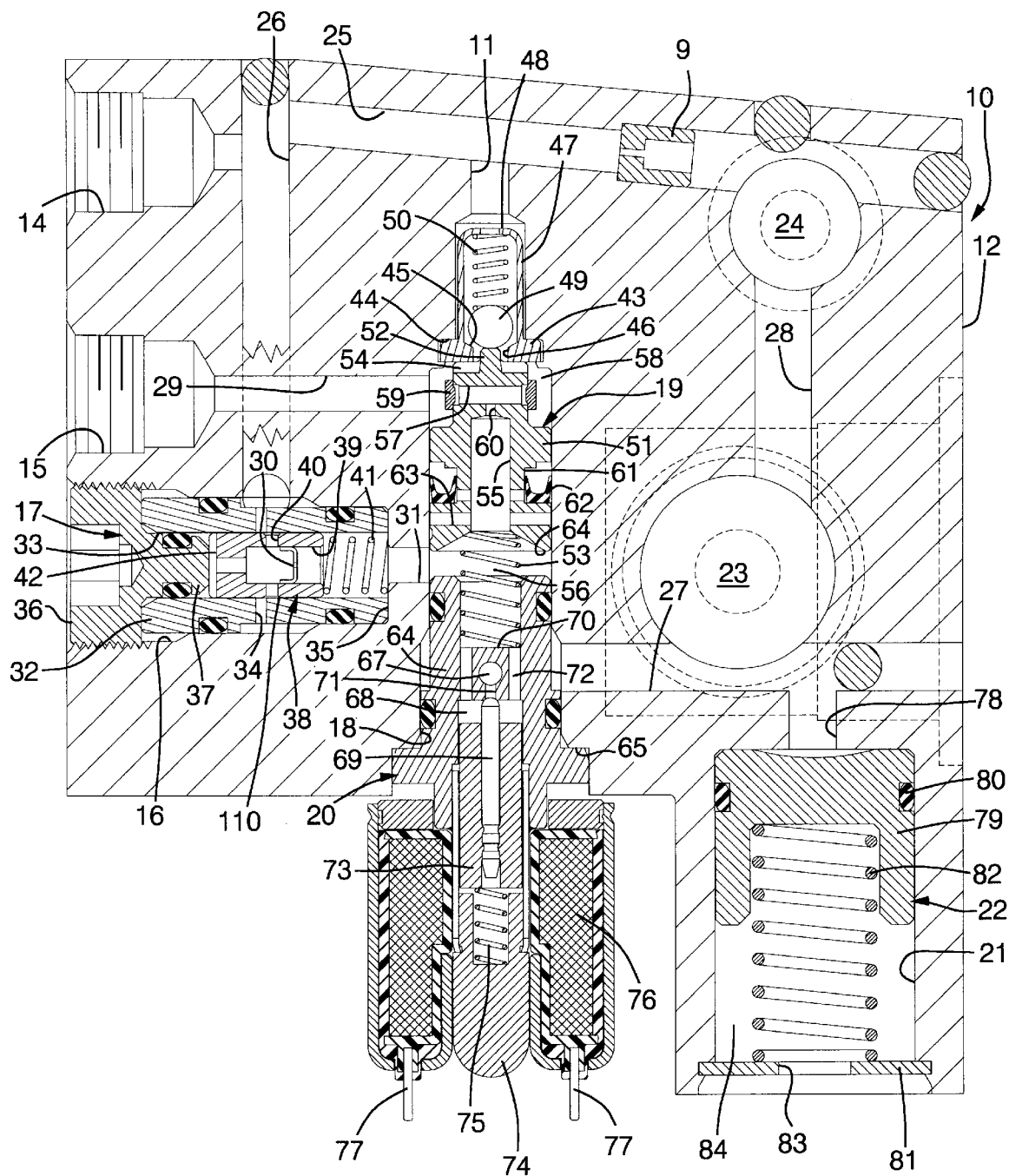
FIG. 1 is a fragmentary cross sectional illustration of a brake system modulator according to the present invention.

Referring to the drawings, illustrated in FIG. 1 is a compact braking system modulator 10 illustrating the general features of one ABS control channel. Modulator 10 includes a body 12 with an opening forming a master cylinder port 14, and another opening forming a wheel brake port 15. In general, the body 12 also includes a bore 16 carrying a flow control valve assembly 17, a bore 18 carrying in combination, an isolation valve assembly 19 and a solenoid valve assembly 20, and a bore 21 carrying an accumulator assembly 22. The body 12 also includes a pump chamber 23 that contains a pump, and includes an associated noise suppression chamber 24. Through a series of communicative passageways formed in the body 12, the master cylinder port 14 is in fluid communication with the bore 18 through passageway 25, and with the bore 16 through passageway 26. The accumulator 22 and inlet to the pump chamber 23 are also open to the bore 18 through passageway 27. The outlet from the pump chamber 23 is open to the bore 18 through passageway 28 and passageway 25 and is also open to the bore 16 through passageways 28, 25 and 26. The wheel brake port 15 is open to the bore 18 through the passageway 29. An orifice insert 9 is positioned in the passageway 25 downstream from the noise suppression chamber 24 to work in concert therewith, in suppressing noise generated in the pump chamber 23.

More specifically, within the body 12 of modulator 10, the bore 16 carries the flow control valve 17 and is formed in a stepped diameter manner, that succeedingly reduces into the body 12. Segment 31 intersects the bore 18 so that the bore 16 is open to the bore 18. The flow control valve 17 includes a generally cylindrical hollow body 32 with a longitudinal opening 33, and the transverse opening 34 intersecting the longitudinal opening 33 at the area that the passageway 26 intersects the bore 16. A pair of seals are provided between the body 12 and the body 32 on opposite sides of the passageway 26 to ensure that all fluid passing through the bore 16 is directed through the transverse opening 34 and the longitudinal opening 33. The body 32 is maintained in position against step 35 by stop 36. Stop 36 is threaded into the bore 16 and includes an extension 37 that enters the longitudinal opening 33 and carries a seal to securely close the outboard end of longitudinal opening 33. A compensating piston 38 comprises a cylindrical body having a longitudinal bore 39 and a transverse bore 40 that intersects circumferential groove 110. Compensating piston 38 is positioned in the longitudinal opening 33. The longitudinal bore 39 is defined concentrically within the longitudinal opening 33 and the transverse bore 40 registers with the longitudinal bore 39 through circumferential groove 110. The compensating piston 38 is biased toward the stop 36 by a spring 41 that grounds the counteracting force by bearing against the step 35. A groove 42 is formed in the end of the compensating piston 38 and intersects the longitudinal bore 39 to prevent the entrapment of fluid between the compensating piston 38 and the stop 36. An orifice insert including a precision orifice 30 is positioned in the longitudinal bore 39 on the downstream side of transverse bore 40. Due to the construction of the flow control valve 17, substantially all fluid flow through the bore 16 between the upstream side at passageway 26 and the downstream side at the intersection of segment 31 and bore 18, must pass through a control opening provided at the intersection between transverse opening 34 and transverse bore 40 and also through the precision orifice 30. A small amount of weepage may occur between the close-fit bore provided by longitudinal opening 33 and the outside diameter of compensating piston 38.

Within the body 12 of modulator 10, bore 18 is also formed in a stepped diameter manner that succeedingly reduces into the body 12 and includes a segment 11 that intersects the passageway 25. Isolation valve assembly 19 is positioned within bore 18. The isolation valve assembly 19 includes a body 43 positioned against step 44, with a valve seat 45 formed by body 43 concentrically about axial opening 46, with a cylindrical extension 47 forming an integral spring seat 48. A ball 49 is carried in the extension 47 and is biased by a spring 50 toward the valve seat 45. Accordingly, any flow passing through the bore 18 and by the isolation valve 19 must pass between the ball 49 and the valve seat 45 and through the axial opening 46.

An isolation valve piston 51 is also positioned in the bore 18 adjacent the body 43 and includes an extension 52 that penetrates the axial opening 46, and under the bias of spring 53, normally lifts the ball 49 off the valve seat 45. The isolation valve piston 51 includes a plurality of grooves 54 that assist in fluid flow through the axial opening 46. The isolation valve piston 51 also includes an axial bore 55 that opens to chamber 56 and a transverse bore 57 that opens to the chamber 58 through the annular filter 59. The transverse bore 57 is open to the axial bore 55 through an isolation valve piston orifice 60. The isolation valve piston 51 also includes an undercut 61 that carries an annular isolation valve lip seal 62 that bears against the body 12 in the bore 18. A transverse opening 63 extends through the isolation valve piston 51 near end 64 to ensure an open route between the chamber 56 and the segment 31 when the isolation valve piston 51 moves to compress the spring 53.

The solenoid valve assembly 20 is positioned in the bore 18 near the isolation valve assembly 19 and provides a controllable opening between the chamber 56 and the passageway 27. Solenoid valve 20 includes a body 64 that is grounded in the bore 18 against step 65. The body 64 includes an opening 67 that registers with the passageway 27 and is normally closed off from a chamber 68 formed in the body 64. Opening 67 is closed by an armature rod 69 that is biased against the bridge 70 of body 64 closing off channel 71 from chamber 68. The chamber 68 is open to the chamber 56 through a plurality of openings 72 formed in the bridge 70. The armature rod 69 is carried by an armature 73 that is biased away from a pole piece 74 by a spring 75. Accordingly, the force of the spring 75 applies the force that normally maintains the solenoid valve 20 in its normally closed condition. The armature 73 and pole piece 74 are surrounded by an annular coil 76 that comprises a plurality of turns of wire wound on a bobbin and is provided with terminals 77 for communication with control electronics.

The solenoid valve 20 normally maintains closure between the chamber 56 and the intake of pump chamber 23. The intake of pump chamber 23 is associated with an accumulator assembly 22 which is positioned in bore 21. Bore 21 is in communication with passageway 27 through channel 78. Accumulator assembly 22 comprises a piston 79 slidably carried in bore 21 with a seal 80 providing fluid tight closure. The piston 79 is maintained in bore 21 by a retainer ring 81 that is fixed in a groove in the body 12 within bore 21, and that supports a spring 82 that biases the piston 79 toward the channel 78. The retaining ring 81 includes an opening 83 that permits breathing of chamber 84 that is defined within bore 21.

Figure 2:
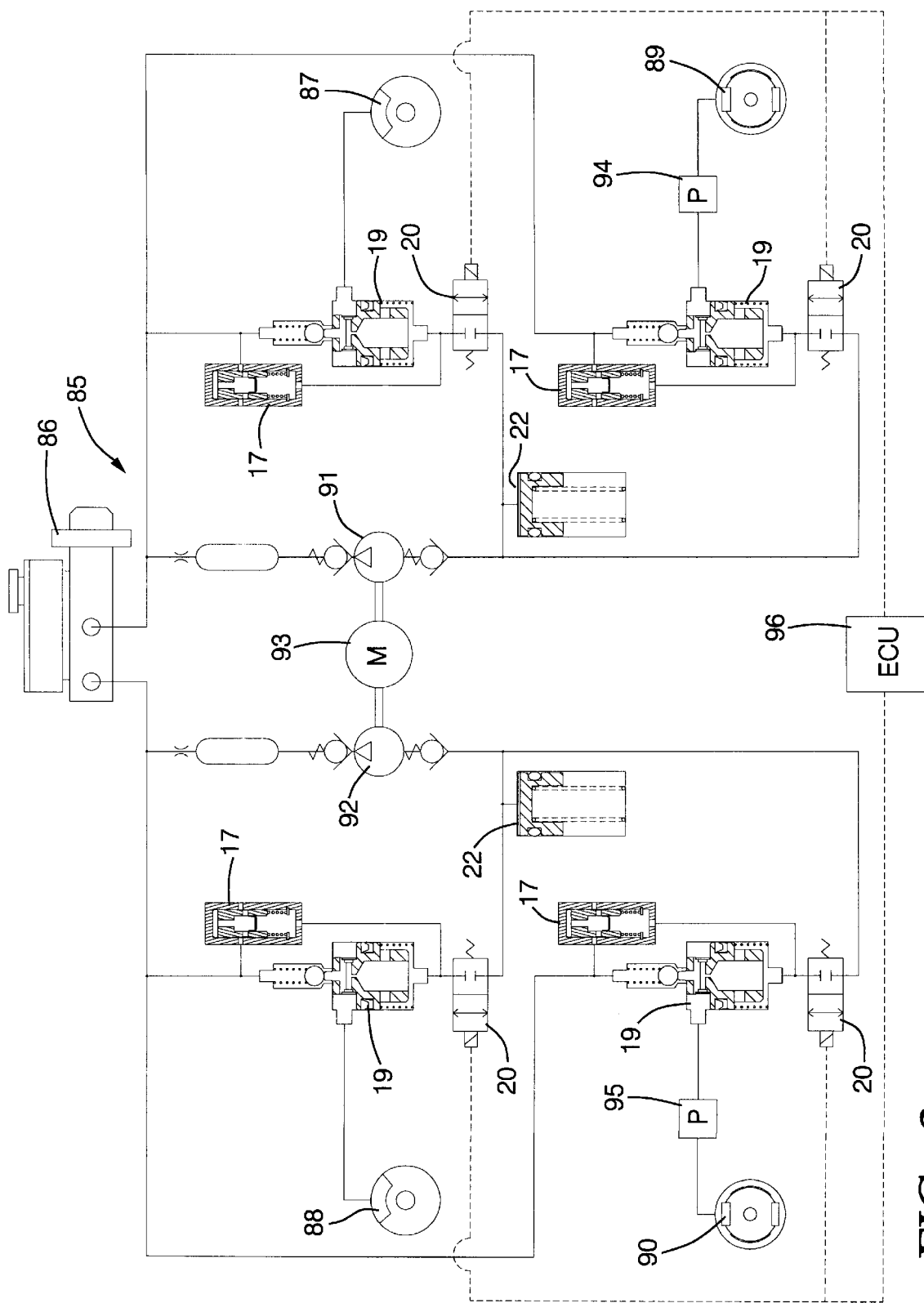
FIG. 2 is a schematic illustration of a brake system according to the present invention.

Referring to FIG. 2, a complete braking system 85 is shown schematically, and is provided in a diagonal split arrangement. The braking system 85 includes a conventional master cylinder assembly 86 and four wheel brakes, including front wheel brakes 87 and 88 and rear wheel brakes 89 and 90. The braking system 85 also includes a dual pump arrangement with pumps 91 and 92 driven by a common motor 93, and includes a pair of optional rear proportioners 94 and 95. Four control channels are provided in the present embodiment, and each includes a flow control valve 17, an isolation valve 19 and a solenoid valve 20 that can be arranged in a common module according to the manner set forth in relation to FIG. 1. Each side of the diagonal split arrangement includes an accumulator 22 that is common to two of the wheel brakes, and the entire system is controlled by a common electronic control unit 96.

Figure 3:
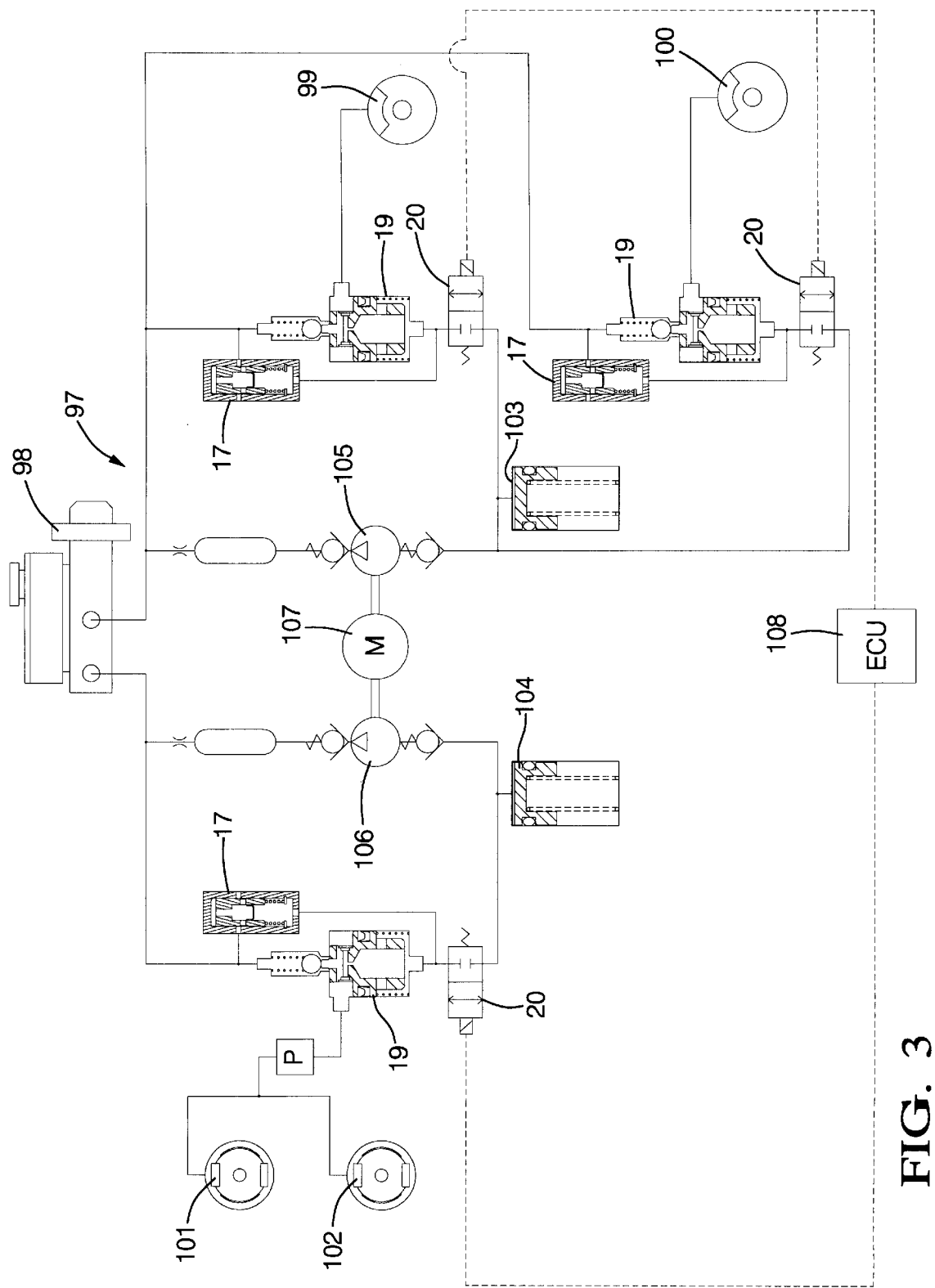
FIG. 3 is a schematic illustration of a brake system according to the present invention.

Referring to FIG. 3, an alternative arrangement of the present invention is illustrated schematically, showing the configuration of a front-rear split braking system 97. The braking system 97 includes a conventional master cylinder assembly 98 and four wheel brakes including front wheel brakes 99 and 100 and rear wheel brakes 101 and 102. The braking system 97 includes three control channels, one for each of the front wheel brakes 99 and 100, and a common control channel for the two rear wheel brakes 101 and 102.

Each of the control channels includes a flow control valve 17, an isolation valve 19 and a solenoid valve 20. The two front control channels are served by a common accumulator 103 and the single rear control channel is served by an accumulator 104. The three control channels can be arranged in a common modulator according to the principles set forth above in relation to FIG. 1. The braking system 97 includes a dual pump arrangement including pumps 105 and 106 which are driven by a common motor 107 and the entire system is controlled by an electronic control unit 108.

Figure 5:
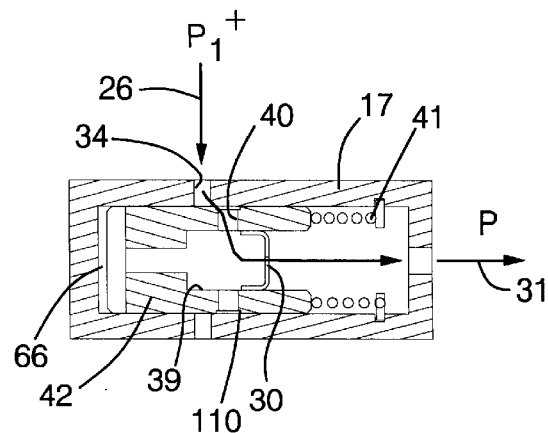
FIG. 5 is a schematic illustration of the flow regulation valve of FIG. 4, shown in a second operative condition corresponding to compensated flow.
Figure 6:
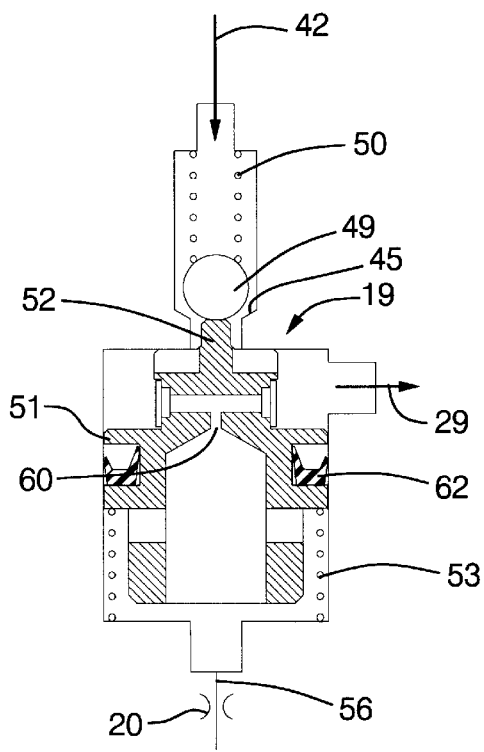
FIG. 6 is a schematic illustration of an isolation valve used in the modulator of FIG. 1 and the brake systems of FIGS. 2 and 3, shown in a first operative condition corresponding to base brake operation.

The configuration of the presently embodied invention is such that in a base brake mode of operation, no electrical power for the hydraulic modulator 10 is required. Referring to the cross section of FIG. 1, as supplemented by the schematic drawings of FIGS. 2–8, it can be observed that with the pump off and the solenoid valve 20 de-energized, fluid can flow and pressure can be transmitted directly between the master cylinder port 14 to the wheel brake port 15 in both the apply and release directions directly through the isolation valve 19, allowing normal unrestricted base brake operation. During base brake operation, the isolation valve 19 is positioned as shown in FIG. 6. This is due to the fact that the isolation valve 19 has the inherent characteristic of a fluid lock that is provided by the orifice 60 connection between the wheel brake and the normally closed solenoid valve 20. The spring 53 located on the bottom side of the isolation valve piston 51 is sufficiently strong to force the ball 49 off the valve seat 45 against the force of its bias spring 50. Since the orifice 60 establishes equivalent pressures on both sides of the isolation valve piston 51, once the valve is opened, the ball 49 will remain off the valve seat 45 unless there is sufficient flow generated through the solenoid valve 20 to disable this "hydraulic lock". In addition to the flow path through the orifice 60, a secondary, significant flow path to the wheel brake port 15 exists from the master cylinder port 14 through the flow regulation valve 17, around the isolation valve lip seal 62 along the wall of the bore 18, and subsequently to the wheel.

An ABS cycle is initiated during operation of the braking system, when excessive wheel slip is detected by the electronic control unit via monitoring of wheel speed sensors. In response, a command is delivered to prompt the hydraulic unit to begin wheel pressure modulation. Initially, the pump (reference numbers 91,92 in FIG. 2, and 105,106 in FIG. 3), is immediately turned on, remains on for the remainder of the ABS cycle, and the normally closed solenoid valves 20 of any and all wheels where immediate pressure reduction is required, are energized. These actions have the effect of allowing immediate flow through the solenoid valve channel 71 from the chamber 56, and subsequently into the pump inlet accumulator 22. The orifice 60 in the isolation valve piston 51 is precisely sized to create a sufficient pressure drop during this ABS release flow through the solenoid valve 20, so that the subsequent pressure imbalance created on the top of the isolation valve piston 51 is sufficient to force the movement of the piston 51 overcoming the biasing force of the isolation valve spring 53. Piston 51 moves to the bottom of its retaining bore contacting the body 64, and thus seating the ball 49 on the valve seat 45 and closing the valve. This closure prevents any additional flow from the master cylinder port 14 from reaching the wheel brakes in the normally unrestricted path through the isolation valve 19.

When the solenoid valve 20 is opened for an ABS release cycle, and during the period while the isolation valve piston 51 is moving as urged by the pressure imbalance, the isolation valve 19 remains open, providing an opening between the wheel brake port 15 and the passageway 27 to the pump inlet. During this period, when there is sufficient pressure in the wheel brake actuator, fluid will continue to flow through the isolation valve piston orifice 60, through the solenoid valve 20, and into the pump inlet accumulator 22. From the accumulator 22, this fluid is pumped back to the master cylinder through the master cylinder port 14, thus closing the hydraulic circuit. An orifice 9 and fluid damper assembly 24 may be added at the outlet of the pump chamber 23 to minimize any noise or pulsations created by the pump from reaching the driver.

Figure 7:
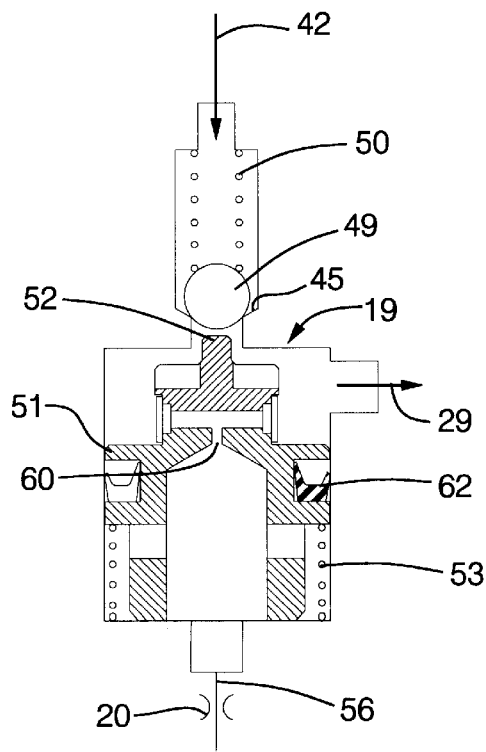
FIG. 7 is a schematic illustration of the isolation valve of FIG. 6, shown in a second operative condition corresponding to an ABS release cycle operation.

During an ABS release cycle, flow is generated through the isolation valve 19 from the wheel brake. FIG. 7 illustrates the positioning of the isolation valve 19 during an ABS release cycle. Release flow passes through the wheel brake port 15, the passageway 29, the transverse bore 57, the orifice 60, the axial bore 55 and the chamber 56 to the solenoid valve 20. Additional flow is generated by master cylinder and pump effluent fluid from the pumping chamber 23 that passes through passageway 26 and through the flow regulation valve 17, since the flow regulation valve 17 does not completely shut off during this period. To compensate for flow through the flow regulation valve 17, the solenoid valve orifice size determined by the diameter of channel 71, is sufficiently large to allow simultaneous flow to occur as a result of releasing fluid from the wheel brake, and the pump/master cylinder effected flow through the flow regulation valve 17. This results in a solenoid valve 20 that is only slightly larger since ABS release flow rates are typically significantly higher than average ABS apply flow rates. However, the size increase is of minimal consequence since the flow regulation valve 17 operates to maintain a constant flow output. This means that high master cylinder pressures (i.e. the driver stepping very hard on the brake pedal) will not influence the flow rate to the wheel brake and thus allows a much more predictable means of control and thus, solenoid valve sizing.

Figure 4:
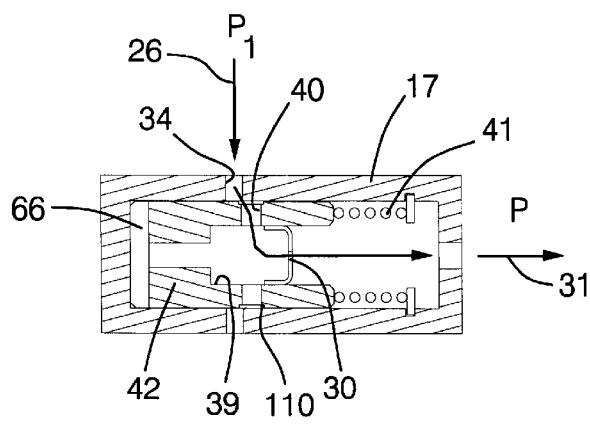
FIG. 4 is a schematic illustration of a flow regulation valve used in the modulator of FIG. 1 and in the brake systems of FIGS. 2 and 3, shown in a first operative condition corresponding to non-compensated flow.

As shown in FIG. 4, with an upstream pressure P1 at the inlet to the flow regulation valve 17, the flow passing through the interface at the margin of registry between the transverse opening 34 and the circumferential groove 110 as intersected by transverse bore 40, is throttled through the orifice 30. As long as the flow is below a certain level, the force created by the throttling effect is balanced by the spring 41 and the compensating piston 38 remains unmoved. With reference to FIG. 5, when the upstream pressure increases to $P_1^+$ a back pressure increase in longitudinal bore 39, created by the orifice 30, is communicated to the chamber 66 and the compensating piston moves to compress the spring 41 reducing the flow area at the interface between the transverse opening 34 and the circumferential groove 110. As a result, a compensated flow rate is effected through the flow regulation valve 17. The flow rate remains largely unchanged and results from the force balance on the valve as a function of pressure differential which is primarily a function of piston diameter, spring force, spring rate and orifice size.

Figure 8:
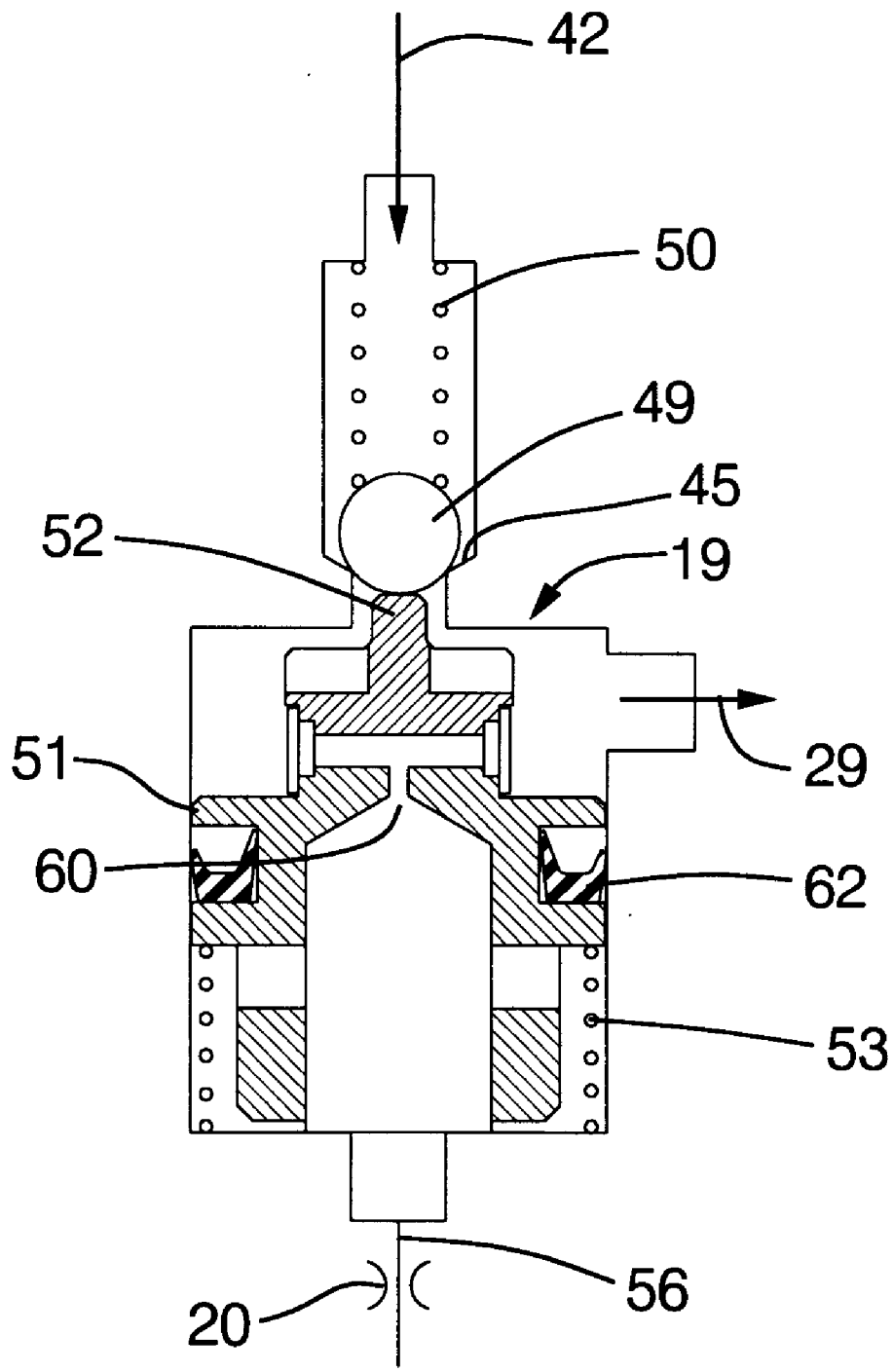
FIG. 8 is a schematic illustration of the isolation valve of FIG. 6, shown in a third operative condition corresponding to an ABS apply cycle operation.

Once the wheel under ABS control begins to re-accelerate from the influence of reducing brake line pressure, the modulator 10 begins to systematically reapply pressure to re-establish maximum possible braking torque. To accomplish this, the solenoid valve 20 is de-energized and allowed to return to its normally closed state. When this occurs, flow ceases through the channel 71 to the pump inlet, and the flow from the flow regulation valve 17 is immediately directed to the wheel brake port 15 to initiate the pressure build cycle. During an ABS apply cycle, the isolation valve 19 is positioned as shown in FIG. 8. Flow from the pumping chamber 23 passes through the flow regulation valve 17 to chamber 56 in bore 18 between body 62 and body 64. Flow from the chamber 56 is directed through the orifice 60 and the transverse bore 57, and in parallel around lip seal 62, to the passageway 29 and on to wheel brake port 15. The flow rate in the flow regulation valve 17 is tunable via two key parameters. One, is the size of the orifice 30, and the other is the operational characteristic of the spring 41. These parameters (orifice size, spring install load, and spring rate), are balanced to give the desired regulated or constant flow rate. Normally, this flow rate is set by the optimized recovery rate on a low-to-high transition. This ensures that the pressure build rate is sufficiently fast to handle all adverse surface conditions.

During an ABS cycle, as pressure continues to build at the wheel brake, wheel slip may once again begin to increase to the point where a pressure release will be required. This process of apply-release-apply, will continue to repeat itself for the remainder of the ABS cycle. Notable, is that the isolation valve 19 remains closed, as defined by seating of ball 49 on seat 45, for both ABS apply and ABS release, and the flow regulation valve 17 remains open for both ABS apply and ABS release. The hydraulic force balance is such that when wheel pressure approaches master cylinder pressure within approximately 50 psi, the isolation valve 19 will automatically re-open and establish unrestricted flows for base brake operation.

The design of the present embodiment is particularly advantageous for a low cost ABS system, and allows for compact modulator packaging and simplified, manufacturable component designs. This is an important consideration in achieving a competitive design. The method of packaging shown by FIG. 1, demonstrates that the isolation valve 19 is packaged in the same stepped bore 18 as the normally closed solenoid valve 20. The flow regulation valve 17 is able to transmit pressure and flow in from the side of bore 18 through bore segment 31 in a simple cross-drilling arrangement. As a result, the overall package size becomes very favorable. The ECU may be either fully integrated with the unit or remotely located, depending upon the application's requirements.

What is claimed is:

1. A braking system comprising:
   a wheel brake;
   a master cylinder;
   a modulator interposed in the braking system and interconnected with the wheel brake and the master cylinder so that fluid pressurization effected in the braking system by the master cylinder is communicated to the wheel brake through the modulator;
   an isolation valve positioned in the modulator and defining a primary flow path for normally permitting an unrestricted fluid flow and pressure exchange between the master cylinder and the wheel brake through the modulator and being operable to prevent fluid flow along the primary flow path from the master cylinder to the wheel brake by movement of a moveable element in the isolation valve;
   a solenoid valve associated with the modulator and being normally closed and being openable so that fluid pressure is released from the wheel brake through the solenoid valve and substantially simultaneously, the moveable element of the isolation valve moves t close the isolation valve to isolate the wheel brake from the master cylinder; and
   a flow regulating valve in the modulator having a compensating piston that automatically moves to provide a substantially consistent flow rate through the flow regulating valve wherein the flow regulating valve has an upstream side that receives fluid pressure and a downstream side that is in fluid communication with the solenoid valve wherein the solenoid valve is sized to accept fluid flow during an ABS release cycle from both the wheel brake to reduce fluid pressure therein and from the flow regulating valve so that flow through the flow regulating valve does not increase fluid pressure at the wheel brake wherein the flow regulating valve supplies fluid to the wheel brake during an ABS apply cycle at a tuned flow rate, wherein the flow regulating valve is connected in a parallel relationship with the isolation valve to provide a secondary flow path around the isolation valve.

2. A braking system according to claim 1 wherein the movable element comprises in combination, a ball that interacts with a valve seat and a piston that includes an extension that reaches through the valve seat and normally unseats the ball through operation of an applied spring bias.

3. A braking system according to claim 2 wherein the modulator has a first bore that carries the isolation valve and the solenoid valve so that a chamber is defined in the bore between the isolation valve and the solenoid valve so that when the solenoid valve is opened, fluid pressure is released from the chamber and the piston is caused to moved into the chamber under the influence of the release of fluid pressure from the chamber wherein the piston overcomes the applied spring bias and wherein the extension retracts from the valve seat so that the ball becomes seated on the valve seat.

4. A braking system according to claim 3 wherein the modulator has a second bore that carries the flow regulating valve wherein the second bore opens to the first bore at the chamber.

5. A braking system according to claim 1 wherein the flow regulating valve includes the compensating piston that is slidably carried in a cylindrical body wherein the cylindrical body includes a transverse opening and wherein the compensating piston includes a transverse bore and wherein the transverse opening registers with the transverse bore through a circumferential groove to admit fluid flow through the flow regulating valve and wherein the compensating piston is biased by a spring to a position establishing maximum registry between the transverse opening and the transverse bore, and wherein flow through the flow regulating valve is routed through a precision orifice in the compensating piston wherein when fluid pressure increases at the transverse opening a corresponding pressure increase at the precision orifice is communicated to a blind chamber adjacent the compensating piston forcing the compensating piston to move to compress the spring effecting a reduction in registry amount between the transverse opening and the circumferential groove so that flow rate through the flow regulating valve is maintained at a substantially consistent rate and wherein the flow regulating valve is never completely closed.

6. A braking system according to claim 3 wherein the piston of the isolation valve includes an undercut that carries an annular lip seal that bears against the modulator in the first bore and wherein the piston includes an orifice and wherein during an ABS apply cycle the ball remains seated on the valve seat and fluid pressure is applied to the wheel brake through the orifice and around the lip seal.

7. A braking system according to claim 6 further comprising a pump, wherein during ABS operation, the pump operates to generate a pressure that is available at the flow regulating valve and wherein during an ABS apply cycle the pump generated pressure is delivered to the wheel brake through the flow regulating valve and through an orifice in the moveable element of the isolation valve.

8. A braking system according to claim 7 further comprising an accumulator that is positioned at an inlet to the pump wherein during an ABS release cycle, fluid pressure is released from the wheel brake through the solenoid valve and to the accumulator, wherein fluid pressure is delivered from the pump to the flow regulating valve wherein flow through the flow regulating valve is delivered through the solenoid valve to the accumulator and the pump.

9. A braking system comprising:

a wheel brake;

a master cylinder;

a modulator interposed in the braking system and interconnected with the wheel brake and the master cylinder so that fluid pressurization effected in the braking system by the master cylinder is communicated to the wheel brake through the modulator;

an isolation valve positioned in the modulator and defining a primary flow path for normally permitting an unrestricted fluid flow and pressure exchange between the master cylinder and the wheel brake through the modulator and being operable to prevent fluid flow along the primary flow path from the master cylinder to the wheel brake by movement of a moveable element in the isolation valve;

a solenoid valve associated with the modulator and being normally closed and being openable so that fluid pressure is released from the wheel brake through the solenoid valve and substantially simultaneously, the moveable element of the isolation valve moves to close the isolation valve to isolate the wheel brake from the master cylinder; and a flow regulating valve in the modulator having a compensating piston that automatically moves to provide a substantially consistent flow rate through the flow regulating valve wherein the flow regulating valve includes a cylindrical body that slidable carries the compensating piston wherein the cylindrical body includes a transverse opening and wherein the compensating piston includes a transverse bore and wherein the transverse opening registers with the transverse bore to admit fluid flow through the flow regulating valve and wherein the compensating piston is biased by a spring to a position establishing maximum registry between the transverse opening and the transverse bore, and wherein flow through the flow regulating valve is routed through a precision orifice formed in an orifice insert that is carried by the compensating piston wherein when fluid pressure increases at the transverse opening a corresponding pressure increase at the precision orifice is communicated to a blind chamber adjacent the compensating piston forcing the compensating piston to move to compress the spring effecting a reduction in registry amount between the transverse opening and the transverse bore so that flow rate through the flow regulating valve is maintained at a substantially consistent rate and wherein the flow regulating valve is never completely closed;

wherein a downstream side of the flow regulating valve is in fluid communication with the solenoid valve and the solenoid valve is sized to accept fluid flow during an ABS release cycle from both the wheel brake to reduce fluid pressure therein and from the flow regulating valve so that flow through the flow regulating valve does not increase fluid pressure at the wheel brake; and wherein the flow regulating valve supplies fluid to the wheel brake during an ABS apply cycle at a tuned flow rate.

10. A braking system comprising;

a wheel brake;

a master cylinder;

a modulator interposed in the braking system and interconnected with the wheel brake and the master cylinder so that fluid pressurization effected in the braking system by the master cylinder is communicated to the wheel brake through the modulator;

a pump operable to generate a pump pressure in the modulator wherein the pump has an inlet;

an accumulator positioned in the modulator in open communication with the inlet of the pump;

an isolation valve positioned in the modulator and defining a primary flow path for normally permitting an unrestricted fluid flow and pressure exchange between the master cylinder and the wheel brake through the modulator and being operable to prevent fluid flow along the primary flow from the master cylinder to the wheel brake by movement of a moveable element in the isolation valve;

a solenoid valve associated with the modulator and being normally closed and being openable so that fluid pressure is released from the wheel brake through the solenoid valve and substantially simultaneously, the moveable element of the isolation valve moves to close the isolation valve to isolate the wheel brake from the master cylinder; and a flow regulating valve in the modulator having a compensating piston that automatically moves to provide a substantially consistent flow rate through the flow regulating valve wherein the flow regulating valve includes a cylindrical body that slidably carries the compensating piston wherein the cylindrical body includes a transverse opening and wherein the compensating piston includes a transverse bore and a circumferential groove intersected by the transverse bore and wherein the transverse opening registers with the circumferential groove to admit fluid flow through the flow regulating valve and wherein the compensating piston is biased by a spring to a position establishing maximum registry between the transverse opening and the transverse bore, and wherein flow through the flow regulating valve is routed through a precision orifice formed in an orifice insert that is carried by the compensating piston wherein when fluid pressure increases at the transverse opening a corresponding pressure increase at the precision orifice is communicated to a blind chamber adjacent the compensating piston forcing the compensating piston to move to compress the spring effecting a reduction in registry amount between the transverse opening and the transverse bore so that flow rate through the flow regulating valve is maintained at a substantially consistent rate and wherein the flow regulating valve is never completely close;

wherein a downstream side of the flow regulating valve is in fluid communication with the solenoid valve and the solenoid valve is sized to accept fluid flow during an ABS release cycle from both the wheel brake to reduce fluid pressure therein and from the flow regulating valve so that flow from the pump delivered through the flow regulating valve does not increase fluid pressure at the wheel brake; and wherein the flow regulating valve supplies fluid to the wheel brake during an ABS apply cycle at a flow rate determined by the precision orifice in the compensating piston and by the spring of the flow regulating valve.

\* \* \* \* \*